United States Patent [19]

Volpe

[11] 4,326,618

[45] Apr. 27, 1982

[54] SAFETY FEED TABLE RELEASE MECHANISM

[75] Inventor: Richard L. Volpe, Hopedale, Mass.

[73] Assignee: White Consolidated Industries, Inc., Cleveland, Ohio

[21] Appl. No.: 160,297

[22] Filed: Jun. 17, 1980

[51] Int. Cl.[3] ............................................ B65G 11/00

[52] U.S. Cl. ...................................... 193/17; 198/750

[58] Field of Search ...................... 193/17, 1; 198/750, 198/865; 271/200, 201; 292/156 T-162, 177-182

[56] References Cited

U.S. PATENT DOCUMENTS 1,239,544 9/1917 Tucker .............................. 292/162

1,298,861 4/1919 Babbitt .............................. 292/177

3,218,064 11/1965 Davidson et al. ............. 198/750 X

*Primary Examiner*—Robert B. Reeves

*Assistant Examiner*—Gene A. Church

*Attorney, Agent, or Firm*—Pearne, Gordon, Sessions, McCoy & Granger

[57] ABSTRACT

A feed table for serially conveying sheets from the stack location magazine of an offset press to its printing head is pivotally mounted at its end adjacent the magazine. The other table end adjacent the printer head is mounted to the printer head housing by a spring-biased release mechanism that can be actuated by a release knob external of the housing to drop the table to a lower position to facilitate access to the interior of the printer head housing. Upward lifting of the printer head adjacent-end of the table by the press operator snaps the release mechanism into a retaining condition to hold the table at its normal raised position for the serial feeding of sheets from the magazine to the printer head. The release mechanism is carried by the feed table and engages with a pair of brackets mounted to the printer head housing.

4 Claims, 9 Drawing Figures

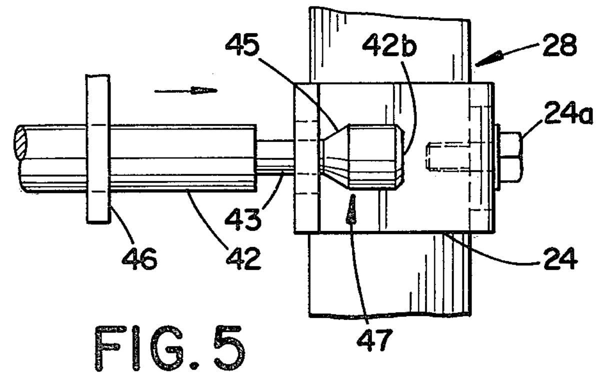
FIG. 5
FIG. 7
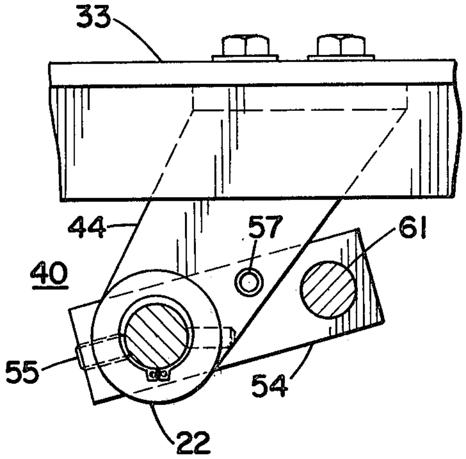
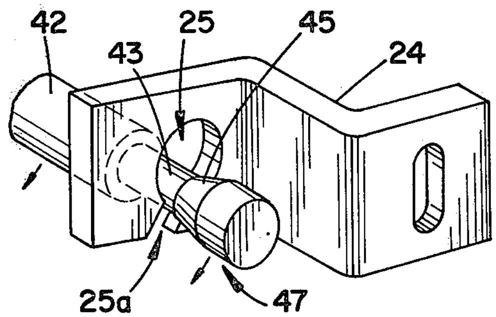
FIG. 6
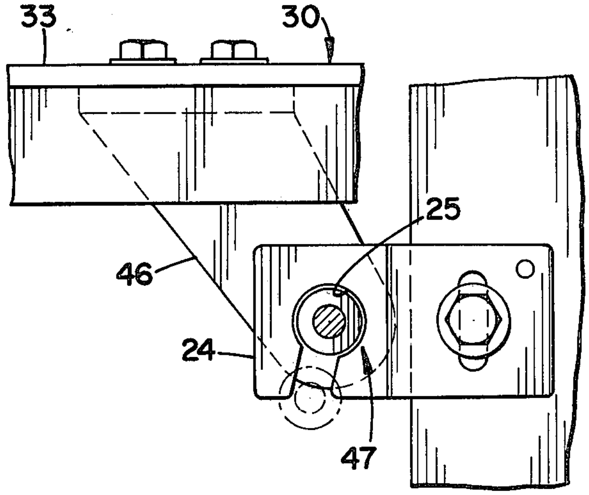
FIG. 9
FIG. 8
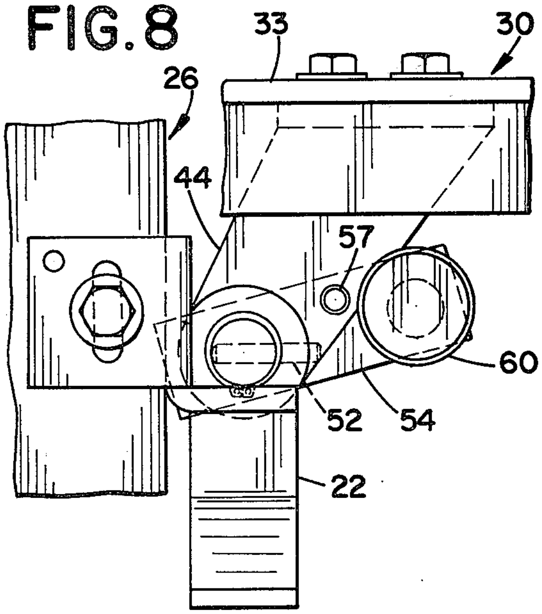

SAFETY FEED TABLE RELEASE MECHANISM

BACKGROUND OF THE INVENTION

The present invention relates in general to mechanisms for releasably supporting a structure and, more particularly, to an offset printing press feed table release mechanism, such release mechanism being tripped by an easily and safely accessible release knob to permit dropping of the feed table to a lowered position to facilitate access to the interior of the printer head of the press.

As taught by U.S. Pat. No. 3,218,064 to Davidson, Jr. et al, the entirety of which is herein incorporated by reference, it is known in the art to support the printer head-adjacent end of an offset press feed table by means of a release mechanism. The Davidson, Jr. et al release mechanism is tripped by a latch handle generally within the paper feed path above the paper feed conveyor and immediately adjacent the printer head housing which contains the rotating printing cylinders. In reaching to trip the release mechanism by means of the latch handle, the press operator may inadvertently allow portions of his hand to enter the printing head housing containing the rotating printing cylinders. Further, as the operator reaches for the Davidson, Jr. et al latch handle, a loose shirt sleeve or the like may snag on the paper feed conveyor and pull the operator's arm into the printer head housing. Finally, movement of the Davidson, Jr. et al latch handle to a release position requires that the handle be moved toward the rotating cylinders within the printing head. It can be appreciated that such a dangerous condition can result in severe injuries to the press operator's hand.

With reference to the Davidson, Jr. et al release mechanism itself, the movable portions of the release mechanism, i.e., catch members 41,42, are fixed to and mounted on each side of the printer head housing. Each catch member supports a side of the feed table end adjacent the printer head. To provide for concurrent movement of the catch members 41, 42 for effective release of the table, a rotatable shaft 46 extends between the catch members across the paper entry opening of the printer head. It can be seen that the shaft 46 impedes access to the printing cylinders once the table is dropped to its lowered position.

A release mechanism avoiding the safety problem as noted above, which would facilitate access to the printing head cylinders, while highly desirable, must also be reliable and of relative simplicity to meet cost goals.

SUMMARY OF THE INVENTION

In accordance with the present invention, bracket means are provided at a fixed location relative to the pivotally mounted end of a feed table. A longitudinally extending rod, mounted on the feed table at a location spaced from its pivotally mounted end, is axially movable back and forth between two end positions. The rod ends lock into the bracket means at one of the end positions to support the table. At the other end position of the axially movable rod, the rod ends are released and unlocked from the bracket means. Preferably, axial movement of the rod is effected by a user-accessible knob rigidly fixed to the rod via an arm member extending radially from the longitudinal axis of the rod, the knob being located below the feed table.

The release mechanism in accordance with the invention substantially lessens the chance that the press operator will inadvertently expose his hand to the rotating printing cylinders in releasing the feed table to allow it to drop to its lower position. Further, the major portion of the release mechanism is carried by the feed table. Thus, when the feed table is dropped to its lower position, the release mechanism is also dropped to a lower position so as not to impede free access to the printer head cylinders.

BRIEF DESCRIPTION OF THE DRAWINGS

Other objects and a fuller understanding of the invention may be had by referring to the following description and claims, taken in conjunction with the accompanying drawings.

FIG. 5 is an elevation view of a support bracket mounted on one side of the printer head housing and engageable with one end of a rod included in the release mechanism;

FIG. 6 is a perspective view of the bracket illustrated in FIG. 5 apart from the printer head housing;

FIG. 7 is a cross-sectional view taken along line 7—7 of FIG. 4;

FIG. 8 is an end view taken along line 8—8 of FIG. 4; and

FIG. 9 is an end view taken along line 9—9 of FIG. 4.

DETAILED DESCRIPTION OF THE PREFERRED EMBODIMENT

Figure 1:
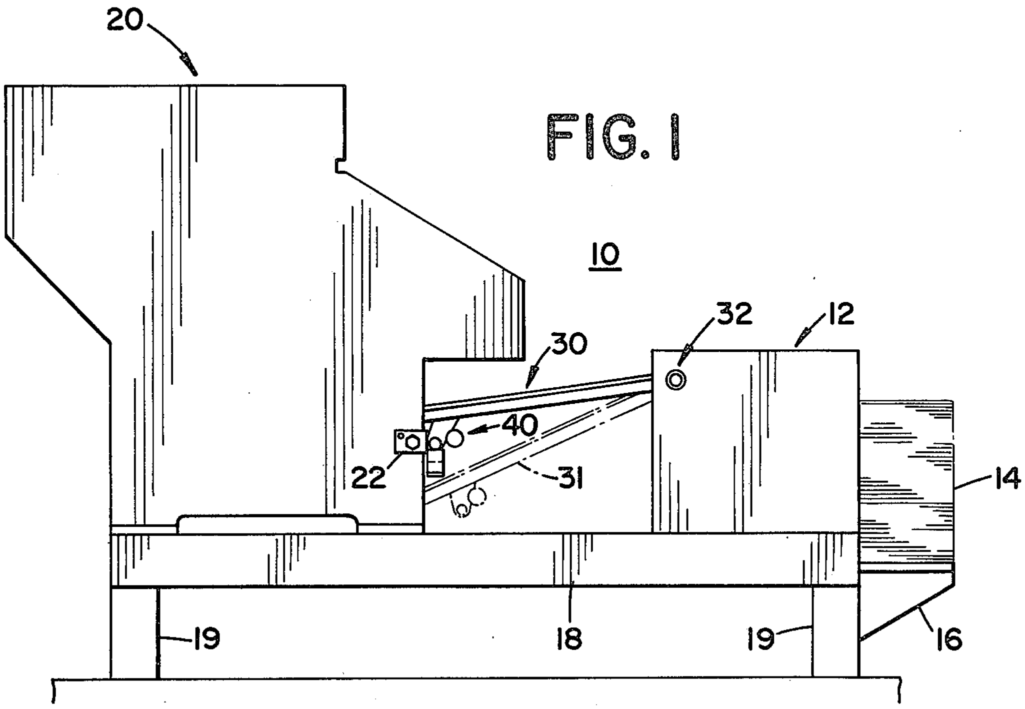
FIG. 1 is a left-side (operator's side) elevation view of an offset press including a feed table supported at one end by a release mechanism in accordance with the invention.

In accordance with the present invention, and with particular reference to FIG. 1, there is illustrated a lithographic offset press 10 as viewed from the left, or operator's side. The press 10 includes a magazine 12 having a conventional sheet feeding means for serially feeding separate sheets from a sheet stack 14 supported by a vertically movable feed pedestal 16. The magazine 12 is itself supported by a base portion 18, in turn supported by four legs 19 (only two shown), the base portion 18 also supporting a cylinder containing printer head 20 spaced from the magazine 12, as illustrated. The printer head 20 is of a conventional nature and contains, for example, a plurality of cylinders including, in the case of offset printing, a blanket cylinder, at least one plate cylinder, and an impression cylinder.

In accordance with known techniques, sheets of material to be printed upon are transferred one at a time from the stack sheet 14 through the printer head 20 wherein the sheets are printed. The printing sheets are then transferred or delivered to a conventional receiving station (not shown).

Figure 2:
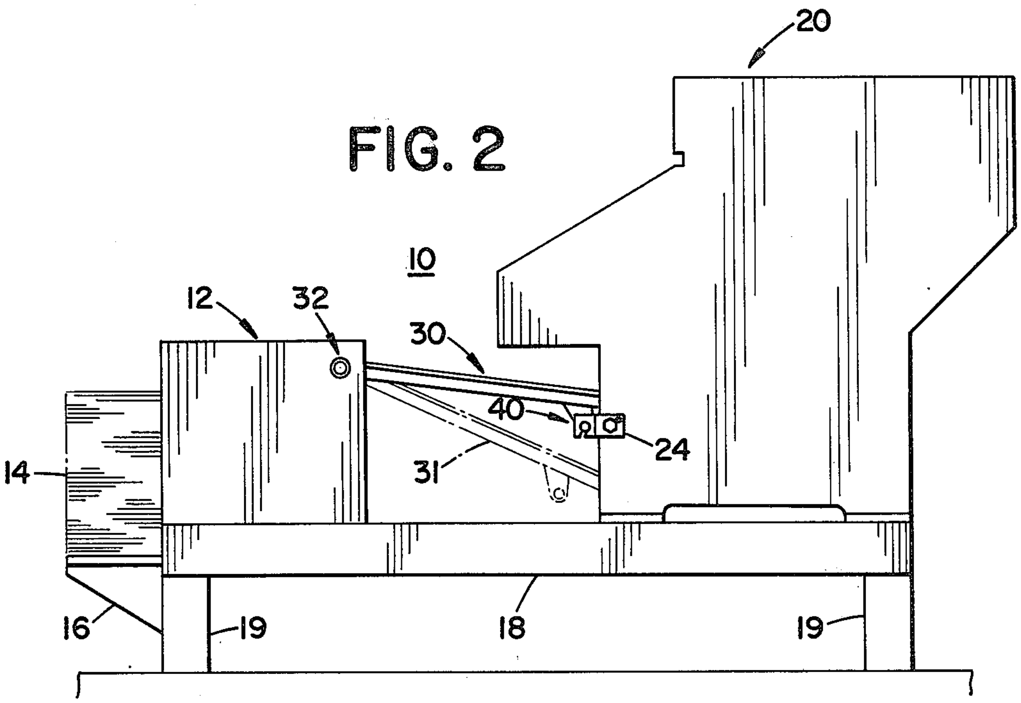
FIG. 2 is a right-side elevation view of the press illustrated in FIG. 1.

With reference to both FIGS. 1 and 2, a feed table 30 extends from the magazine 12 to the printer head 20 and serves to transfer or convey the sheets to be printed upon. The magazine-adjacent end of the table 30 is pivotally mounted by conventional pivot means 32 for pivotal rotation thereon. The other end of the table 30, i.e., the printer head-adjacent end, includes a mechanism in accordance with the invention for releasably supporting that end of the table. The release mechanism 40, when tripped to a releasing or unlocking condition, allows the table to drop to its lower position as illustrated in phantom as referenced to numeral 31. With the table 30 at its lowered condition, the press user has access to the interior of the printer head 20 to effect, for example, adjustment of the printing plate carried on the plate cylinder or to clean the blanket and impression cylinders when necessary.

When it is desired to resume a printing operation, the table 30 is raised by hand for pivotal movement about the pivot means 32 until the release mechanism 40 locks into position for support by a left-side feed table support bracket 22 (FIG. 1) and a right-side feed table support bracket 24 (FIG. 2). These brackets 22,24 are fixed to the printer head, and particularly to the printer head housing, in a manner to be subsequently illustrated in detail.

It is to be noted that, while the table 30 with its release mechanism 40 has been illustrated as incorporated into a lithographic offset printing press 10, other types of printing presses or other apparatus requiring a table means such as feed table 30 may be employed.

Figure 3:
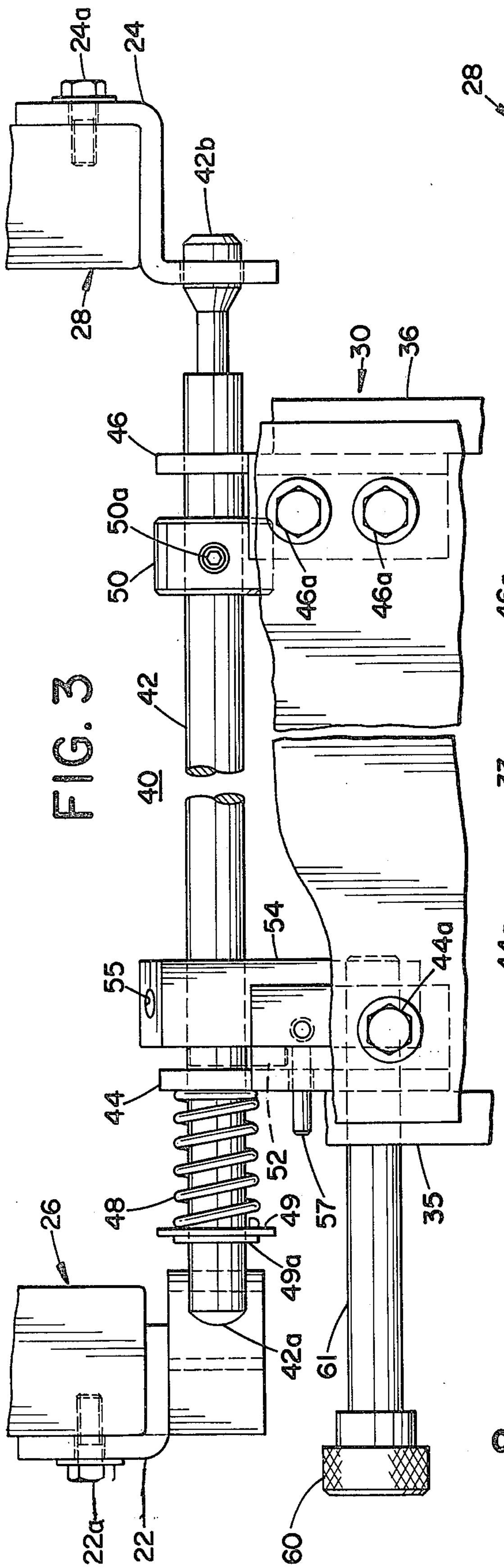
FIG. 3 is a plan view of the release mechanism in accordance with the invention, with portions of the release mechanism and the associated feed table cut away.
Figure 4:
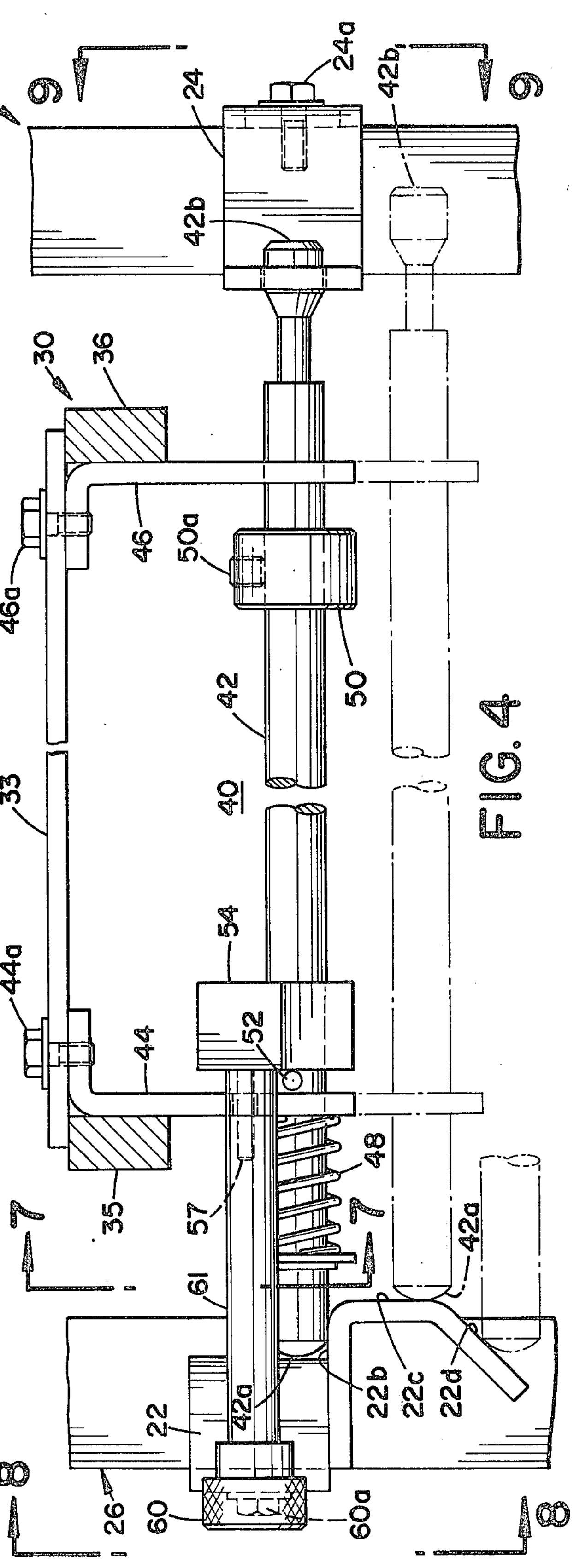
FIG. 4 is an elevation view of the release mechanism in accordance with the invention, with portions of the release mechanism cut away.

With reference to FIGS. 3 and 4, the release mechanism 40 is shown in greater detail. The printer head includes a housing having a left printer head housing wall 26 and a right printer head housing wall 28. The left-side feed table support bracket 22 is secured to the left printer head housing wall 26 by a suitable fastener in the illustrated form of a bolt 22*a* threaded into the wall 26. A corresponding bolt 24*a* serves to secure the right-side feed table support bracket 24 to the right printer head housing wall 28. The brackets 22,24 in their mounted positions lie generally along a common horizontal axis extending in parallel relative to the axis of rotation of the feed table about its pivotally mounted end adjacent the magazine 12 (see FIGS. 1 and 2).

The feed table 30 includes a left-side support rail 35 and a right-side support rail 36 extending from the magazine 12 to the printer head 20 (see FIGS. 1 and 2), the rails 35,36 being generally parallel to each other and spaced apart to carry a flat sheet-metal table portion 33. The table portion 33 is fastened to the rails 35,36 by suitable means, such as, for example, welding.

The release mechanism 40 in accordance with the present invention is carried by the feed table 30, and in particular by the table portion 33 to which is fastened a left-side release mechanism support bracket 44 and a corresponding right-side release mechanism bracket 46, the brackets being secured to the table portion 33 by appropriate bolts 44*a* and 46*a*. The release mechanism support brackets 44,46 extend vertically downwardly at a slight angle away from the table portion 33 and are of generally equal vertical lengths and are in parallel relation to each other.

The lower portions of the brackets 44,46 each include an aperture, preferably defined by a bushing, having a diameter sized to receive a longitudinally extending rod 42 that is axially movable back and forth to a limited degree, the rod being generally parallel to the axis of rotation of the table about its pivotally mounted end. The rod ends include one end face 42*a* to the left side of the press and another end face 42*b* to the right side of the press. The rod 42 is spring-biased to the left, as viewed in FIGS. 3 and 4, to establish one end position. Spring-biasing of the rod is provided by a spirally wound, longitudinally extending biasing spring 48 which is fitted around the rod 42 as illustrated. The spring 48 is sandwiched between the left side release mechanism support bracket 44 and a spring retaining washer 49 which is held in position by a shaft-engaging retaining ring 49*a* received with a circumferential groove in the rod 42. Axial movement of the rod 42 to the right is limited by a stop collar 50 which is held in position on the rod 42 by means of a stop collar setscrew 50*a*. Conversely, a stop pin 52 press-fitted radially into the rod 42 extends radially away from the rod to provide a stop for limiting axial movement of the rod 42 to the left, as viewed in FIGS. 3 and 4. It can be seen that the degree of axial movement of the rod 42 is governed by the distance between the stop collar 50 and the stop pin 52. At a normal biased position, the spring 48 biases the rod 42 to its far left position, wherein the pin 52 abuts the support bracket 44. At this position, with the table 30 at its raised position as earlier illustrated in FIGS. 1 and 2, the ends of the rod 42 each engage a respective one of the feed table support brackets 22,24.

To move the rod 42 to the right, wherein the spring means 48 is compressed between the moving washer 49 and the fixed bracket 44, and the ends of the rods are released from engagement with the support brackets 22,24 for dropping of the table 30, a release knob 60 is provided. The release knob 60 is rigidly connected to the rod 42 via a release knob shaft 61 having one end to which the release knob 60 is fastened by a knob-retaining nut 60*a*. The other end of the shaft 61 is fixed to the end of a radially extending release knob support arm 54 having its other end apertured to receive the rod 42 as illustrated, a support arm setscrew 55 rotationally locking the release knob support arm 54 relative to the rod 42. A pin 57 extends perpendicularly from the surface of the arm 54 in a direction parallel to the rod 42, the pin extending through an aperture in the bracket 44, as illustrated. The length of the pin 57 is at least as great as the axial distance that the rod 42 is capable of moving wherein the pin 57 is always retained with the aperture of bracket 44, to thereby preclude rotation of the rod 42. The release knob shaft 61 extends in a direction generally parallel to the rod 42, the shaft 61 extending from below the feed table 30 and being spaced from the printer head 20 (see FIG. 1), such an arrangement lessening the possibility of an operator's hand, when grasping the release knob 60, being exposed to the rotating cylinders within the printer head.

To disengage the ends of the rod 42 from the brackets 22 and 24, the press operator pushes the knob 60 from left to right, as illustrated in FIGS. 3 and 4, to move the rod 42 axially to the right until the stop collar 50 abuts the right release mechanism support bracket 46.

With particular reference to FIG. 4, the disengagement from the bracket 22 of the left end of the rod 42, and in particular its end face 42*a*, will be discussed. When the table 30 is at its normal raised position, the left end of the rod 42 is supported from below by a support ledge portion 22*b* which extends in a horizontal direction. Upon disengaging movement of the rod 42 to the right, the left end of the rod will slide off the support ledge portion 22*b*, wherein the table 30, which carries the rod 42, will begin to move downwardly, either by gravity or by force applied by the press operator. It is noted that the other end of the rod, i.e., the right end of the rod including end face 42*b*, is free to move downwardly in a manner to be subsequently discussed in detail. As the rod 42*a* at its far right axial end position moves down, the end face 42*a* engages with a flat portion 22*c* of the bracket 22. At this position, it can be seen that the operator may release the knob 60 with the rod 42 being held at its far right axial end position with the spring means 48 in compression due to the retaining effect of the flat portion 22*c*.

Upon continued downward movement of the table 30, the end face 42*a* of the rod, as illustrated in phantom, reaches a ramp portion which slopes away from the rod end face 42*a* in a downward direction. Due to the biasing effect of the spring means 48, as the table moves downwardly, the end face 42*a* will slide along or ride the ramp portion 22*d* to return the rod 42 to its normal leftmost position. The table 30 is now free to continue its downward movement to its lower position 31, as illustrated in FIGS. 1 and 2.

It can further be seen that the operator of the press, without manipulation of the release knob 60, can return the table to its raised position by lifting upward thereon and lock it in place, since the end face 42*a* as it moves upward will engage the lower portion of the ramp portion 22*d* and ride upwardly thereon, moving to the right until reaching the flat portion 22*c* and maintaining its rightmost position until it clears the upward end of the flat portion 22*c* wherein the biasing effect of the compressed spring means 48 snaps the end face 42*a* of the rod leftward over the support ledge portion 22*b* to effectively support the table 30 from below.

The disengagement of the other end of the rod, including the end face 42*b*, from the right side feed table support bracket 24 will now be discussed with particular reference to FIGS. 5 and 6. When the left end face 42*a* is riding on the flat portion 22*c* and the left feed table support bracket 22, the rod 42 is held at its rightmost position for a predetermined period of its downward travel. The far right end portion 47 of the rod 42 is of a diameter generally equal to the central portion of the rod 42 as illustrated. Such end portion 47 is separated from the central portion of the rod 42 by a reduced diameter portion 43 and a truncated cone portion 45 having its apex inboard of its base portion.

As illustrated in FIG. 6, the bracket 24 includes an aperture 25 of a diameter slightly larger than the diameter of the end portion 47. The aperture opens downwardly to a slot 24*a* having a width generally equal to the reduced diameter portion 43 of the rod 42, the slot lying along the arcuate path that the reduced diameter portion 43 will follow as the table 30 moves downwardly. When the rod 42 is at its rightmost position, the reduced diameter portion 43 is aligned with and can move downwardly through the slot 25*a* so as to disengage from the right feed table support bracket 24. When the table 30 is in its fully raised position, the rod 43 is at its leftmost position, as discussed with regard to FIGS. 3 and 4, and the end portion 47 engages with and is retained within the aperture 45, since its diameter is substantially greater than the width of the slot 25*a*, i.e., the end portion 47 cannot move downwardly through the slot 25*a*.

It can be seen that with axial movement of the rod 42 to the right, as illustrated in FIG. 4, both rod ends are free to move downwardly to disengage from their respective feed table support brackets 22,24. Conversely, upward movement of the table from its lower position re-establishes the far right axial end position of the rod 42 wherein the reduced diameter portion 43 of the rod 42 is vertically aligned with the slot 25*a* of the bracket 24 to permit reinsertion of the rod end portion 47 into the aperture 25 as the rod 42 snaps leftwardly on reaching the top of the flat portion 22*c* of the bracket 22. The truncated cone portion 45 separating the end portion 47 from the reduced diameter portion 43 of the rod serves to effectively guide the end portion 47 into the aperture as the rod moves leftward upon locking into position at its raised position. The base portion of the cone is of a diameter equal to the end portion 47, while the apex portion of the truncated cone portion 45 is of a diameter generally equal to the reduced diameter portion 43 received in a slot 25*a*. With reference to FIG. 9, the end portion 47 is shown in an engaged position within the aperture 25 to effectively maintain the table 30 at its raised position by supporting it and also to preclude its being raised any further.

With respect to FIGS. 7 and 8, the left side support bracket 22 is shown supporting the feed table 30 with the release knob 60 being spaced away from the housing wall 26 and located below the table 30. Such a position of the release knob 60 greatly lessens the possibility that a press operator can, in releasing the table 30, injure his hand by inadvertently allowing it to enter the printer head housing at a point above the feed table 30 wherein the hand could be dangerously exposed to the rotating cylinder within the printer head.

It can be seen that the release mechanism in accordance with this invention provides a safe means for lowering of the feed table mechanism 40, while at the same time being of relative simplicity and of a straightforward design.

Although the preferred embodiment of this invention has been shown and described, it should be understood that various modifications and arrangements of the parts may be resorted to without departing from the scope of the invention as disclosed and claimed herein.

What is claimed is:

1. A mechanism for releasably supporting the end of a table having its other end pivotally mounted, comprising:

a pair of table support brackets fixed in location relative to the pivotally mounted end of the table, the brackets being spaced from each other and lying generally along a common axis; and a longitudinally extending rod mounted to the table at a location spaced from its pivotally mounted end, the rod being axially movable back and forth between two end positions, the rod lying generally along said common axis and being spring-biased toward one of said end positions, the ends of the rod at said one of said end positions lockably engaging the brackets when the table is in a raised position, the ends of the rod at the other of said end positions being free to disengage from the brackets to permit pivotal movement of the table to a lower position, wherein one of said brackets includes a horizontally extending support ledge portion and a ramp portion extending downwardly from a ledge portion end, the ramp portion sloping in a downward direction away from the end of the rod engageable with said one of said brackets, the rod being spring-biased toward the ramp portion, upward movement of the table from its lower position causing the end face of the rod end engageable with said one of said brackets to contact the ramp portion, continued upward movement of the table causing the ramp portion to apply a horizontal force component to the end face to axially move the rod away from said one of said brackets, the rod end engageable with said one of said brackets being supported from below by the ledge portion when, upon continued upward movement of the table, the end face reaches the top of and disengages from the ramp portion, the rod snapping back to its biased end position, the said rod end overlying the supporting ledge portion.

2. A mechanism according to claim 1, including user-accessible means for moving the rod axially away from its spring-biased end position to disengage said rod end from the supporting ledge wherein the table is free to pivotally move downwardly to its lower position, said user-accessible means including an arm member extending generally radially from the rod and fixed rigidly thereto and a knob mounted on the distal end of the arm member, the knob being located below the plane of the feed table.

3. A mechanism according to claim 1, said one of said brackets including a vertically extending flat portion separating the horizontal ledge portion and the ramp portion, the flat portion engaging the end face to maintain the rod at a constant axial position during a portion of the upward travel of the table, the other bracket including an aperture sized to receive and support the other end of the rod, said other bracket including a slot extending downwardly from the aperture and opening to receive a reduced diameter portion of said other end of the rod as the table moves upwardly, the width of the slot being less than the diameter of the aperture, the said reduced diameter portion being inboard of the end face of said other end of the rod, the reduced diameter portion being vertically aligned with and received by the slot as the table moves through said portion of upward travel when the rod is maintained at said constant axial position by said flat portion, the reduced diameter portion moving out of vertical alignment with the slot when the rod snaps back to its biased end position, the said other end being received by the aperture and supported by said one of said brackets.

4. A mechanism according to claim 3, wherein the reduced diameter portion is located generally at the apex of an axially extending truncated cone portion of the rod, the base portion of the truncated cone portion being of a diameter generally equal to the aperture, the aperture being circular, the truncated cone portion serving to guide the said other end into receiving relationship with the aperture as the reduced diameter portion moves out of vertical alignment with the slot as the rod snaps back to its biased end position at the raised position of the table.

* * * * *